(12) United States Patent
Nakada

(10) Patent No.: US 7,269,204 B2
(45) Date of Patent: Sep. 11, 2007

(54) PATH DIVERSITY RECEIVER APPARATUS AND METHOD OF SPECTRUM SPREAD COMMUNICATION SYSTEM

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 415 days.

(21) Appl. No.: 10/507,916

(22) PCT Filed: Mar. 19, 2003

(86) PCT No.: PCT/JP03/03350

§ 371 (c)(1),
(2), (4) Date: Oct. 25, 2004

(87) PCT Pub. No.: WO03/079568

PCT Pub. Date: Sep. 25, 2003

(65) Prior Publication Data

US 2005/0117631 A1   Jun. 2, 2005

(30) Foreign Application Priority Data

Mar. 20, 2002  (JP) ............................. 2002-078714

(51) Int. Cl.
  *H04B 1/00*  (2006.01)
(52) U.S. Cl. ................. 375/148; 375/316; 375/347
(58) Field of Classification Search ........ 375/130–150, 375/260, 267, 316, 347, 349
See application file for complete search history.

(56) References Cited

U.S. PATENT DOCUMENTS 6,389,060 B1 * 5/2002 Naruse ................ 375/130
6,421,373 B1 * 7/2002 Saito ................... 375/148
6,785,257 B1   8/2004 Miyatani

FOREIGN PATENT DOCUMENTS

| EP | 1220482 A1 | 7/2002 |
|---|---|---|
| JP | 10-178386 A | 6/1998 |
| JP | 2000-312168 A | 11/2000 |
| JP | 2001-94473 A | 4/2001 |
| JP | 3346415 B2 | 4/2001 |
| JP | 2002-246952 A | 8/2002 |
| JP | 3279297 B2 | 8/2002 |
| WO | WO 99/60729 A1 | 11/1999 |
| WO | WO 01-22638 A1 | 9/2000 |

* cited by examiner

*Primary Examiner*—David C. Payne
*Assistant Examiner*—Rahel Guarino
(74) *Attorney, Agent, or Firm*—Sughrue Mion Pllc.

(57) ABSTRACT

A path detector (100) provides statistics of rates at which preamble signals are detected within a predetermined time period. For a delay amount segment where the detection rate is low, the sampling rate of correlation value calculation is reduced, and the number of correlator sets used for the preamble signal detection is reduced. Correlator sets made available by that reduction are used to detect message signal paths, thereby raising the operating rate of the RAKE receivers of a decoder (200) to improve the throughput of the message signals. Further, the statistics of the rates of preamble signal detections are periodically updated, and when the preamble signal detection rate of the delay amount segment where the sampling rate was reduced becomes higher, the number of the correlator sets used for the preamble signal detection is increased so as to return the sampling rate to its original value.

12 Claims, 8 Drawing Sheets

A: PATH DETECTOR
B: DECODER
C: PATH INFORMATION
CS: CORRELATOR SET
RR: RAKE RECEIVER d: FOR PREAMBLE SIGNAL DETECTION
e: FOR MESSAGE SIGNAL PATH DETECTION
f: UNUSED
g: MESSAGE SIGNAL DECODING

FIG. 4

100: PATH DETECTOR
101-112: CORRELATOR SET
200: DECODER
201-212: RAKE RECEIVER

CS: CORRELATOR SET
RR: RAKE RECEIVER
G1,G2: GRAPH
a: FOR PREAMBLE SIGNAL DETECTION
b: FOR MESSAGE SIGNAL PATH DETECTION
d: INTERVAL A
e: INTERVAL B
f: INTERVAL C
g: INTERVAL D h: PATH INFORMATION
i: UNUSED
j: DECODING MESSAGE SIGNALS
k: STATE A
l: STATE B
m: PREAMBLE SIGNAL
  DETECTION FREQUENCY
n: THRESHOLD o: DELAY AMOUNT INTERVAL
p: CHANGE FOR MESSAGE
  SIGNAL PATH DETECTION
q: DECODING MESSAGE
  SIGNALS

PATH DIVERSITY RECEIVER APPARATUS AND METHOD OF SPECTRUM SPREAD COMMUNICATION SYSTEM

TECHNICAL FIELD

The present invention relates to a path diversity reception device with random access using preamble signals in a spread spectrum communication system, and particularly, to the realization of a high-throughput communication method in a mobile communication system.

BACKGROUND ART

In a mobile communication system using CDMA (Code Division Multiple Access) which has become increasingly common in recent years, random access is used for one of uplink channels from a mobile station to a base station. For example, in IMT-2000 (DS-CDMA), a PRACH (Physical Random Access Channel) corresponds thereto. Channel models and communication protocols of the PRACHs, which are described in documents such as 3GPP TS25.211, etc., use preamble signals as signals for,conveying message signal transmission permission request from a mobile unit to a base station, and message signals for transmitting information from an actual mobile unit.

Here, it is throughput that is important in transmitting/receiving PRACHs which are first transmitted when a mobile unit is powered on, and when calling as well as when packet data is transmitted. This is because poor PRACH throughput causes the user to feel inconvenienced by 'not readily getting through'. The simplest way to enhance this throughput is to increase the number of simultaneous decoding, i.e., the number of allowable simultaneous decoding of PRACH message signals in a base station, as an alternative to reducing signal errors to reduce the number of times of retransmission.

Figure 1:
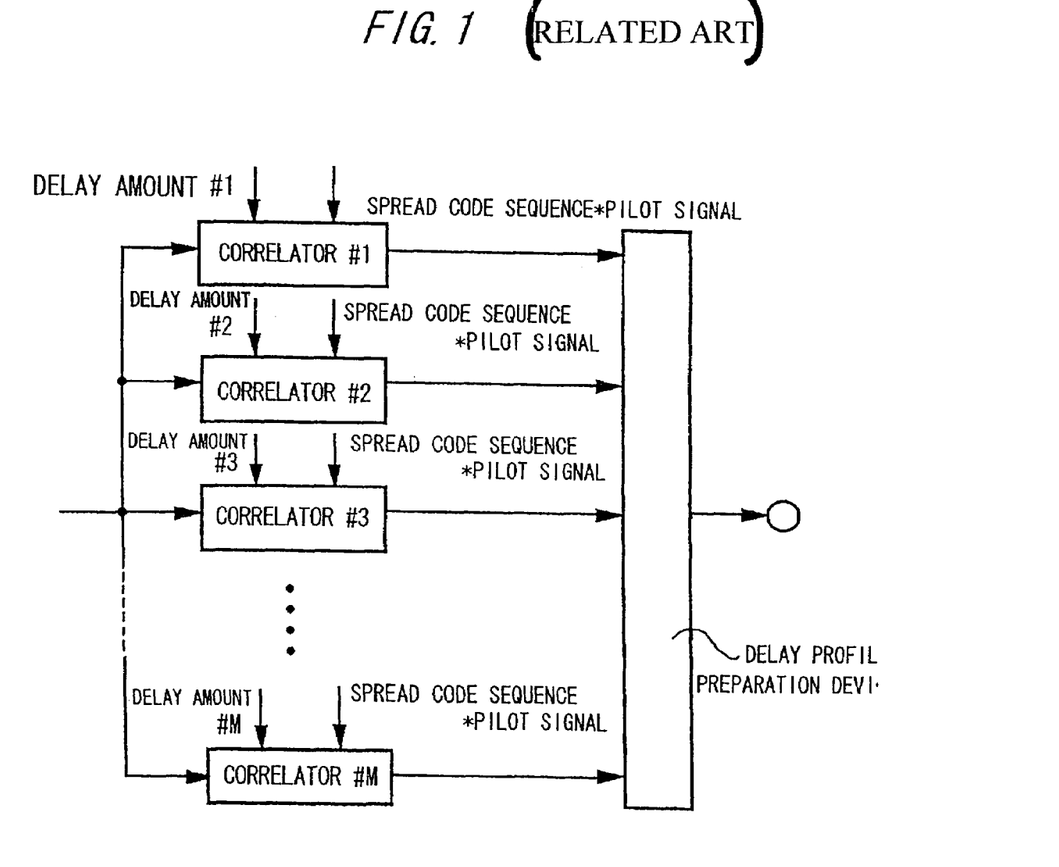
FIG. 1 is a diagram showing one example of a conventional path detection correlator set.
Figure 2:
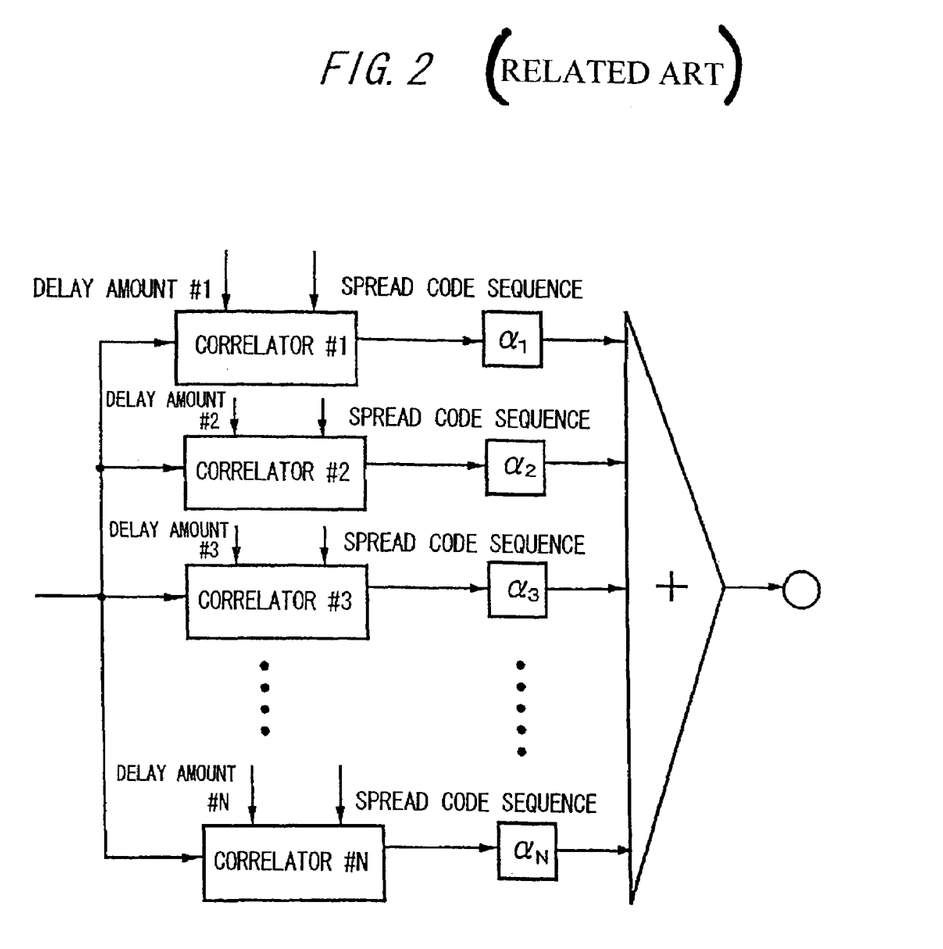
FIG. 2 is a diagram showing one example of a conventional RAKE receiver.
Figure 3:
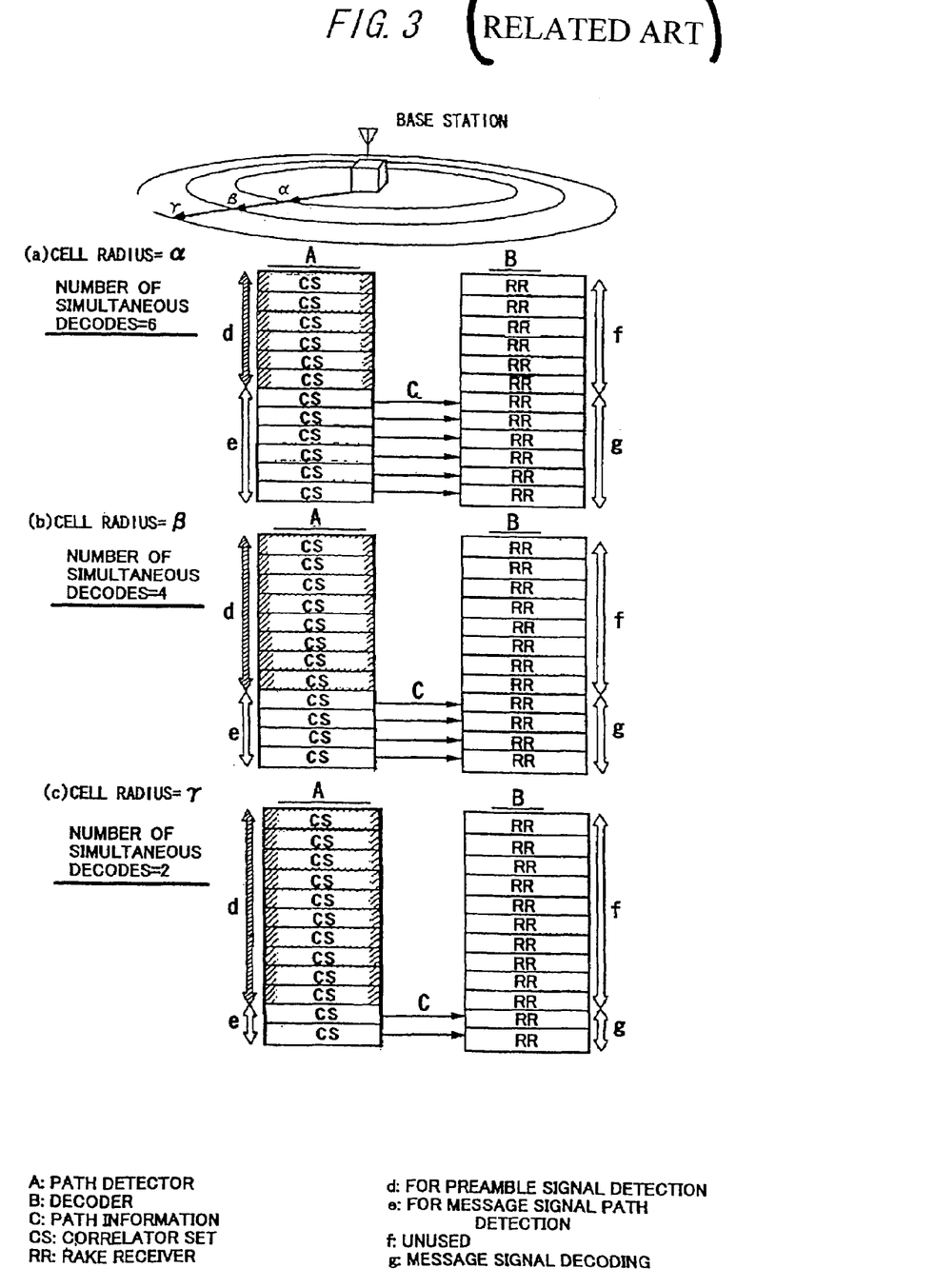
FIG. 3 is a diagram showing the relationships between cell radii and the number of simultaneous decoding.

To increase the number of simultaneous decoding, however, from the point of view of device scale and cost, it is not very well advisable to simply increase the number of a path detection correlator set as in FIG. 1 and RAKE receivers as in FIG. 2. The correlator set is used not only for message signal path detection, but also for preamble signal detection. In detecting message signal paths, a delay profile is selectively obtained in the vicinity of a delay amount in which are received preamble signals, whereas, in detecting preamble signals, because of no such preliminary information, the use of a correlator set to obtain a delay profile is required for all of up to a maximum delay amount matched to a cell radius. Therefore, as the cell radius is larger as in FIG. 3, more correlator sets are required for preamble signal detection, while the number of correlator sets that can be used for message signal path detection is limited. As a result, the number of RAKE receivers that can be operative in the decoder is also decreased.

Accordingly, it is an object of the present invention to provide a path diversity reception device and method for a spread spectrum communication system with improved throughput by efficiently using a signal-processing portion of the path diversity reception device when implementing random access using preamble signals in the spread spectrum communication system such as a CDMA system, etc., used in mobile communications, etc.

DISCLOSURE OF INVENTION

According to the present invention, in order to solve the above problems, a path diversity reception device for a spread spectrum communication system takes statistics of frequency at which preamble signals within constant time are detected by a path detector, drops a sample rate of correlation value calculation in a delay amount interval in which detection frequency is low, and decreases the number of correlator sets used in detecting preamble signals, while the remaining correlator sets are used in detecting message signal paths, thereby increasing an operation rate of RAKE receivers of a decoder, and enhancing the throughput of message signals. Statistics of detection frequency of preamble signals are regularly updated, and when preamble signal detection frequency in a delay amount interval in which the sample rate has been dropped is increased, the number of the correlator sets used in detecting preamble signals is controlled to be increased to restore the sample rate.

BEST MODE FOR CARRYING OUT OF THE INVENTION

The preferred embodiments according to the invention will be explained below referring to the drawings.

Figure 4:
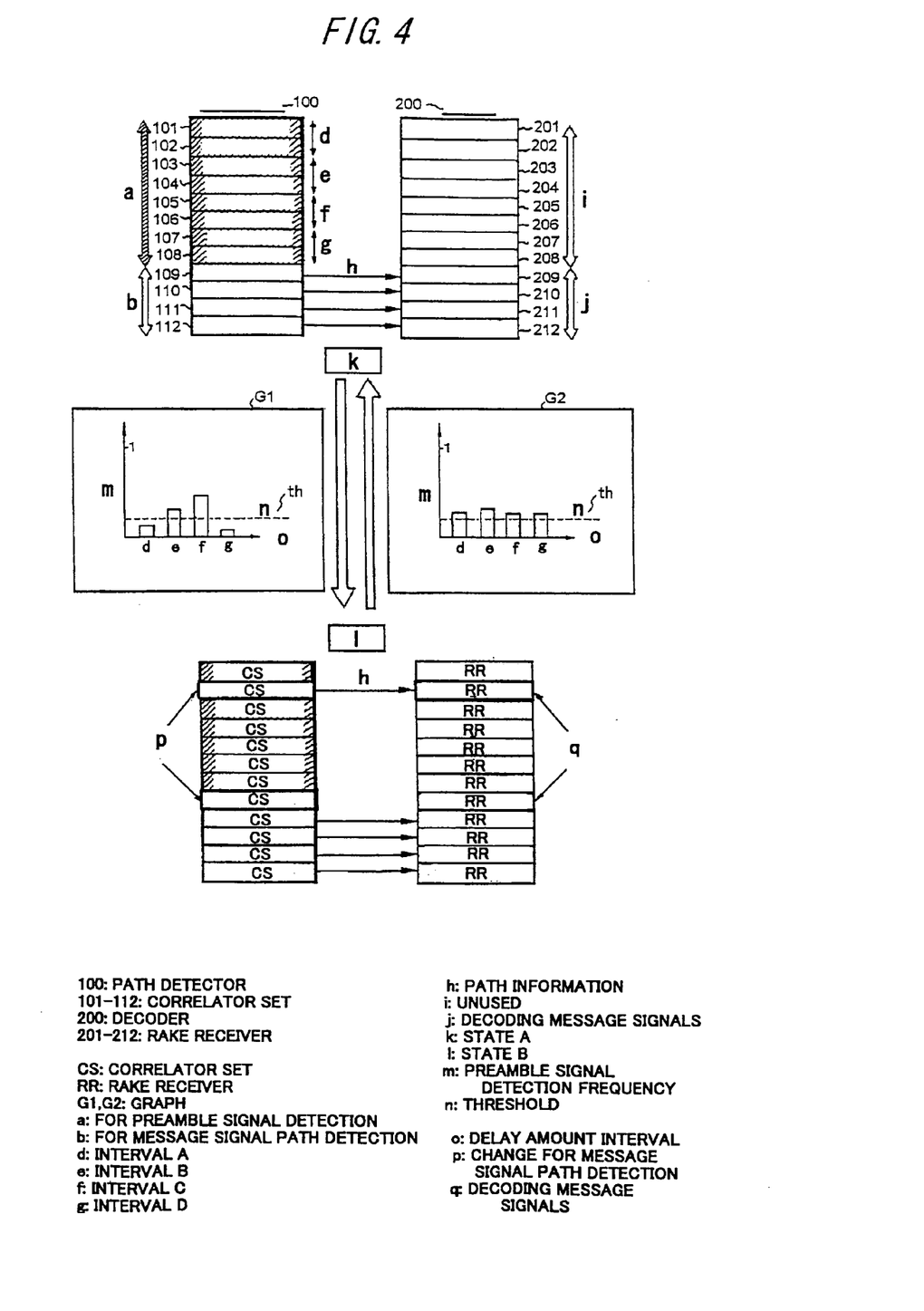
FIG. 4 is a functional block diagram of an essential portion for explaining the present invention.

FIG. 4 is a functional block diagram of an essential portion for explaining the present invention. FIG. 4 shows an example in which the present invention is applied to a CDMA mobile communication system, and in which are depicted functional blocks of a portion of a baseband signal-processing portion when a base station receives PRACHs (Physical Random Access Channels) as described in 3GPP TS25.211 V3.8.0, chapters 5.2.2.1 and 7.3 which defines the standards of Physical Channels of IMT-2000 (DS-CDMA).

In FIG. 4, a received-signal-processing portion of the base station of the CDMA mobile communication system comprises a path detector 100 for preamble signal detection and message signal path detection, and a decoder 200 for decoding message signals. The path detector 100 comprises correlator sets 101-112, and detects preamble signals and paths for receiving message signals. The decoder 200 comprises RAKE receivers 201-212, and performs path diversity reception of message signals, using path information notified from the path detector 100.

Since preamble signal detection requires processing for all of up to a maximum value of a delay amount determined by a cell radius, as the cell radius is larger, the number of correlator sets used for preamble signal detection is increased. In FIG. 4, the correlator sets 101-108 are used for preamble signal detection, while the correlator sets 109-112 are used for message signal path detection.

On the other hand, in the decoder 200, since maximum 4 message signal path information is simultaneously notified from the path detector 100, the corresponding 4 RAKE receivers 209-212 are used in decoding the message signals. For this reason, the RAKE receivers 201-208 remain unused. Since the number of these unused RAKE receivers is increased as the cell radius is larger and the number of the correlator sets used for preamble signal detection is increased in the path detector 100, it is desirable to be able to use these RAKE receivers in building a system, if possible.

The present invention takes statistics of frequency at which preamble signals within constant time are detected in the path detector 100, drops a sample rate of correlation value calculation in a delay amount interval in which detection frequency is low, and decreases the number of the correlator sets used in detecting preamble signals, while the remaining correlator sets are used in detecting message signal paths, thereby increasing an operation rate of the RAKE receivers of the decoder 200, and enhancing the throughput of the message signals. Statistics of detection frequency of preamble signals are regularly updated, and when preamble signal detection frequency in a delay amount interval in which the sample rate has been dropped is increased, the number of the correlator sets used in detecting preamble signals is controlled to be increased to restore the sample rate.

Figure 5:
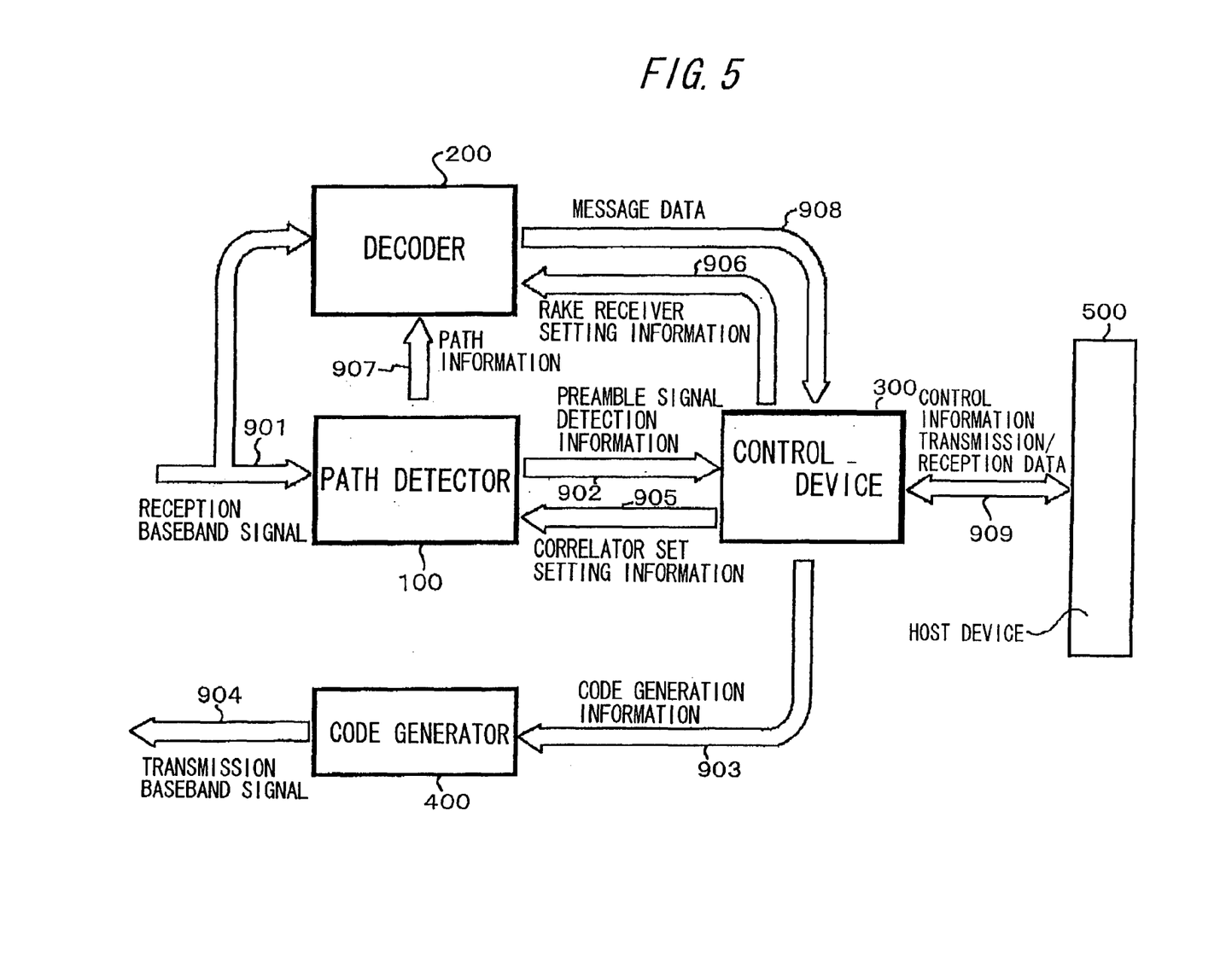
FIG. 5 is a block diagram of a baseband signal-processing portion in a base station.

FIG. 5 is a block diagram of a baseband signal-processing portion in a base station including the functional blocks depicted in FIG. 4.

Figure 6:
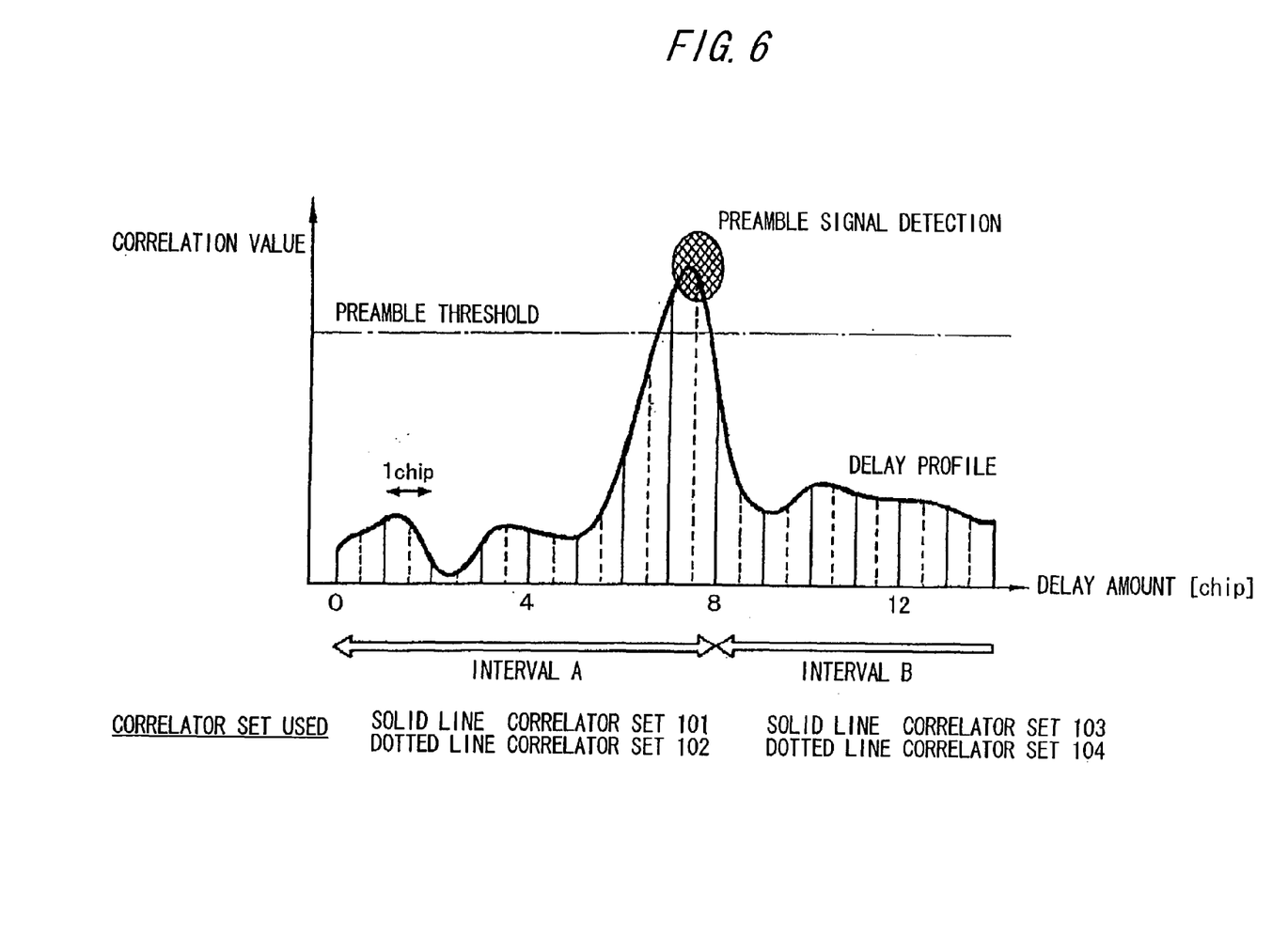
FIG. 6 is a diagram showing an example of the correspondences between correlator sets and delay amount intervals.

FIG. 6 shows an example of the correspondences between correlator sets and delay amount intervals when preamble signals are detected in the path detector 100 of FIG. 4.

Figure 7:
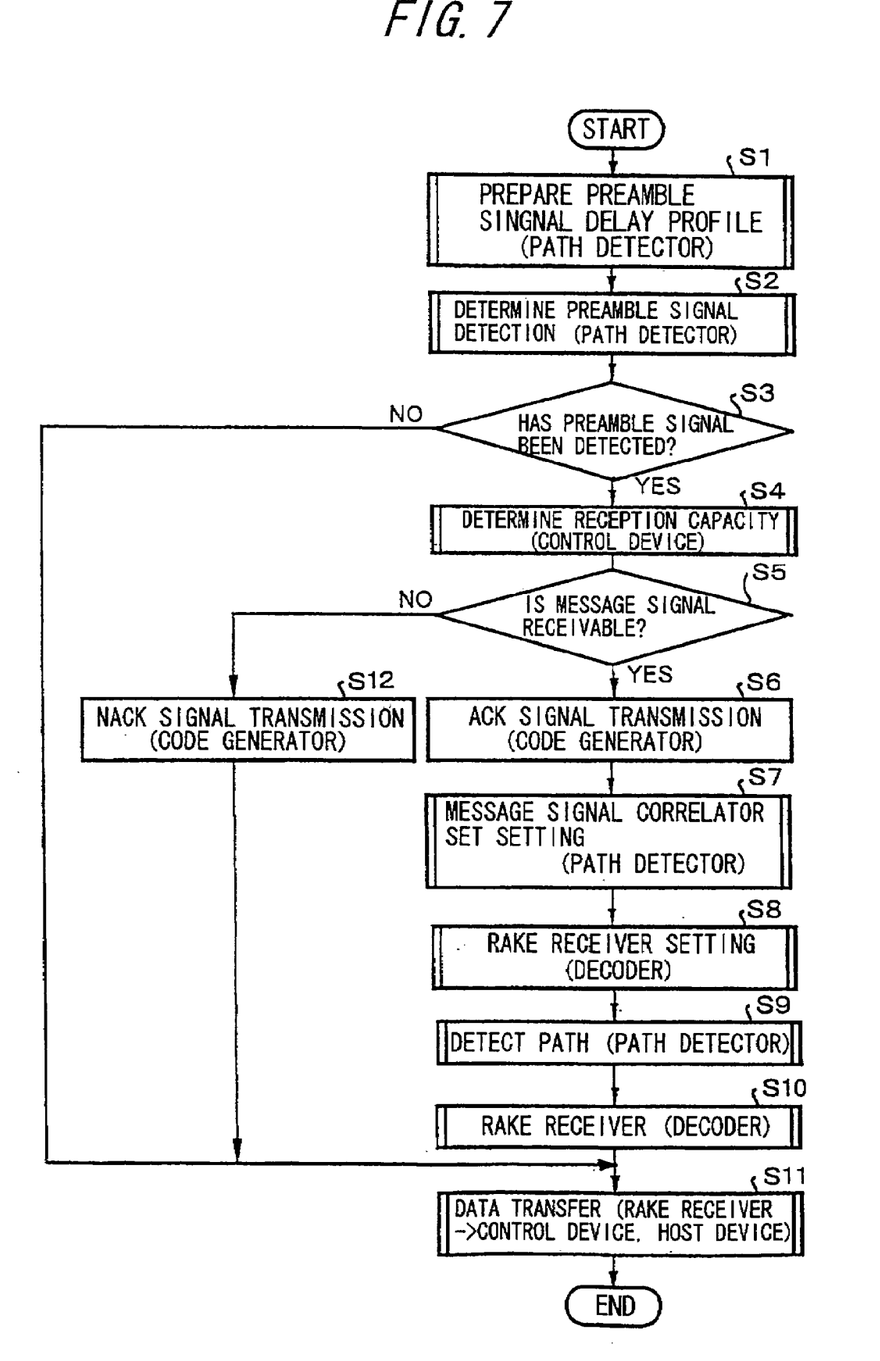
FIG. 7 is a flowchart for explaining PRACH calling processing sequence.

FIG. 7 is a flowchart for explaining PRACH calling processing sequence in the present embodiment. Reception baseband signals 901 demodulated beforehand by a demodulator are input to a path detector 100 shown in FIG. 5. In step S1, the path detector 100 first obtains a delay profile of a delay amount corresponding to a cell radius, and in step S2, detects preamble signals by determining that the preamble signals are detected when a correlation value peak exceeds a certain threshold (a preamble threshold).

When obtaining a delay profile, in the present embodiment, as shown in FIG. 6, the entire delay amount is divided into short delay amount intervals for every 8 chips. For each interval, 2 correlator sets are used to calculate correlation values at a ½-chip sampling rate. In this case, the correlator sets used for every ½ chip are alternately changed. In other words, the correlator sets 101 and 102 of FIG. 4 are alternately used in delay amount interval A of 0 to less than 8 chips, and the correlator sets 103 and 104 are alternately used in delay amount interval B of 8 to less than 16 chips. (Although omitted in FIG. 6, the correlator sets 105 and 106 are alternately used for every ½ chip in delay amount interval C of 16 to less than 24 chips, and the correlator sets 107 and 108 in delay amount interval D of 24 to less than 32 chips.)

When preamble signals are detected in the path detector 100 in step S3, its detection information and information on a delay amount in which the preamble signals are detected, i.e., preamble signal detection information 902 is notified to a control device 300 in step S4. The control device 300 always manages the use of the correlator sets of the path detector 100. When the detection of preamble signals is notified, the control device 300 first determines whether there are remaining correlator sets assigned to message signal path detection in step S5. When there are remaining correlator sets, the control device 300 sends code generation information 903 to a code generator 400 to transmit to a mobile unit ACK signals for permitting the transmission of message signals in step S6. On the contrary, when there are no remaining correlator sets, the control device 300 sends code generation information 903 to the code generator 400 to transmit to the mobile unit NACK signals for prohibiting the transmission of message signals in step S12. Actually, according to the code generation information 903, the code generator 400 generates transmission baseband signals 904 indicating ACK or NACK signals, which are sent to a modulator.

When sending ACK signals to the mobile unit in step S6, the control device 300 subsequently sends correlator set setting information 905 to the path detector 100, sets spread codes and timing for one of the correlator sets reserved for message signal path detection, and starts message signal path detection processing in step S7. The control device 300 also sends RAKE receiver setting information 906 to a decoder 200 to set spread codes, data formats, etc in step S8.

The path detector 100 directed to perform message signal path detection processing by the correlator set setting information 905 performs path detection of message signals transmitted from the mobile unit, with designated correlator sets and timing in step S9. In this case, a delay profile is selectively obtained in the vicinity of a delay amount in which are received preamble signals, and a high correlation value position is searched.

Path delay amount information found in this manner is notified to the decoder 200 as path information 907. This information is set in one of the RAKE receivers within the decoder 200 to decode the message signals in step S10. And, message data 908 obtained is sent via the control device 300 to a host device 500 in step S11.

Figure 8:
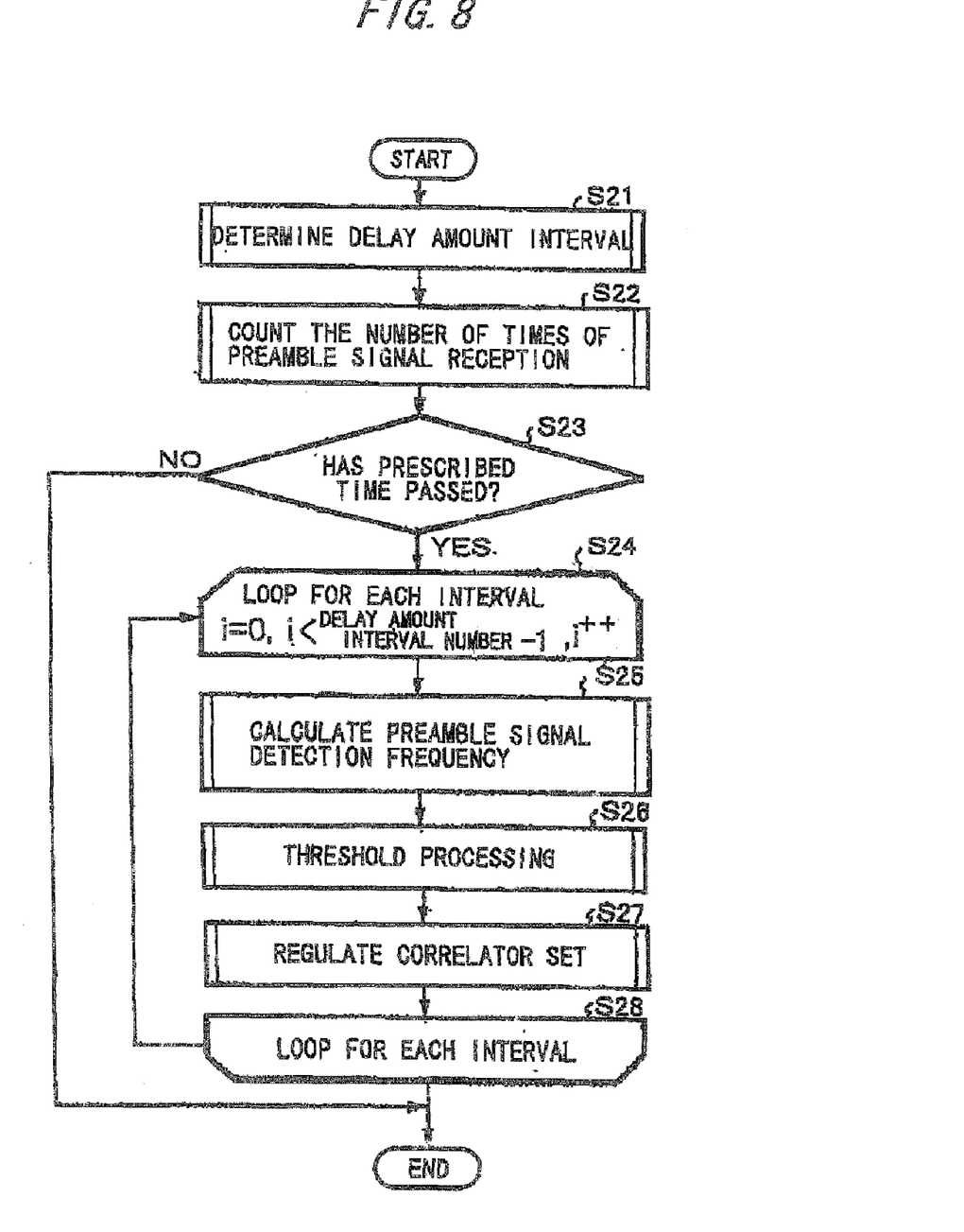
FIG. 8 is a flowchart for explaining processing sequence concerning correlator set management.

FIG. 8 is a flowchart for explaining processing sequence concerning correlator set management in the present embodiment. The control device 300 shown in FIG. 5 manages the correlator sets within the path detector 100 after or in parallel with PRACH calling processing. When preamble signals are detected, the control device 300 first determines in which delay amount interval the preamble signals are detected from delay amount information contained in preamble signal detection information 902 sent from the path detector 100 in step S21. And, the number of times of reception is tabulated while detecting the preamble signals for each delay amount interval in constant time in step S22. After prescribed time has passed in step S23, loop processing for each delay amount interval is performed in steps S24-S28. This loop processing for each interval is iterated from i=0 to i=(delay amount interval number−1) sequentially adding 1 to i. For each interval, by dividing the number of times of reception of the preamble signals by the total number of times of sampling of the preamble signals within that time, preamble signal detection frequency for each delay amount interval is obtained in step S25. For a delay amount interval in which its result is lower than a predetermined threshold in step S26, the number of the correlator sets used in preamble signal detection is controlled to be decreased to lower the sample rate of correlation value calculation. This control information is sent to the path detector 100 as correlator set setting information 905.

This sequence of controls allows surplus correlator sets to be used for message signal path detection. The preamble signal detection frequency on which is based this control is updated for every constant time. Even if the sample rate is temporarily lowered at preamble signal detection frequency below a threshold, if this detection frequency goes above the threshold, the sample rate can be restored into the original state again by adding correlator sets. This control is also performed by the control device 300 sending control information to the path detector 100 as correlator set setting information 905.

For example, in FIG. 4, for the correlator sets 101-112 within the path detector 100 and the RAKE receivers 201-212 within the decoder 200, it is assumed that, as in the initial state A, the correlator sets 101-108 are used for preamble signal detection, the correlator sets 109-112 are used for message signal path detection, and the RAKE receivers 209-212 are used in decoding message signals. Here, in the decoder 200, the message signal decoding is performed only by the 4 RAKE receivers 209-212. This is because the 4 correlator sets 109-112 send only their respective corresponding 4 message signal path information.

In this state, preamble signals are detected using the correlator sets 101-108. After constant time has passed, preamble signal detection frequency for each delay amount interval is obtained. A result such as graph G1 is assumed to be obtained. As seen from graph G1, since the preamble signal detection frequency is below the threshold th in the intervals A and D, the respective numbers of the correlator sets in charge of the intervals A and D are decreased by 1. In other words, as shown in the state B of FIG. 4, the preamble signal detections in the intervals A and D are respectively performed by only the correlator sets 101 and 107, while the surplus correlator sets 102 and 108 are used for message signal path detection. This allows the number of the correlator sets used for message signal path detection in the path detector 100 to be increased. As a result of that increase, the number of the RAKE receivers that can be operative for message signal decoding in the decoder 200 can also be increased.

Since the numbers of the correlator sets used in the intervals A and D are decreased, on the other hand, the sample rate for delay profile preparation is changed from ½ chip to 1 chip. However, because it has been found from the preamble signal detection frequency that the numbers of preamble signals detected in these intervals are small, the number of mobile units affected by it is small. Even if the mobile unit transmits preamble signals in these intervals, the preamble signals are not entirely undetectable in the base station, and the extent of the problem is such that since an accurate correlation value peak cannot be obtained due to the decrease of the sample rate, detection probability is decreased. Because the PRACHs standardized in 3GPP TS25.211 have protocols for control of preamble signal retransmission and transmission power control during its retransmission, preamble signals can be detected in the base station by several times of retransmission even in the worst case.

Next, in the layout of the correlator sets of the state B, preamble signals are detected, and preamble signal detection frequency for each delay amount interval is calculated. Preamble signal detection frequency distribution such as graph G2 is assumed to be obtained. Because the preamble signal detection frequency is above the threshold th in the intervals A and D, the numbers of the correlator sets in these intervals are controlled to be restored to change the sample rate for a delay profile from 1 chip to ½ chip. In other words, the setting modification is such that the correlator sets 102 and 108 which have been used for message signal path detection are used for preamble signal detection in the original intervals A and D.

To this end, since path information from the path detector 100 no longer reaches the RAKE receivers 202 and 208 which have decoded the message signals in the decoder 200, these RAKE receivers are restored into the original unused states.

The present invention is not limited to the above embodiment, but may be applied to the following systems:
(1) A mobile communication system other than IMT-2000 (DS-CDMA);
(2) A system where a mobile station side serves as a reception side in random access;
(3) A subscriber radio access system and an autonomous distributed system where no base station control is performed;
(4) A system where path diversity reception is performed without CDMA;
(5) A system where surplus RAKE receivers according to the effect of the present invention are used not for PRACH message signals, but for other channel (voice and data dedicated channel) reception; and
(6) A system having a path diversity reception function but no random access as in the embodiment, and which can control the number of correlators and sample rate for path detection according to path detection frequency.

The numbers of the correlator sets and RAKE receivers, delay amount interval width, sample rate values, etc., shown in the above embodiment, may be modified according to system and environment.

Furthermore, as an extension of the present invention, instead of the preamble signal detection frequency, delay amount magnitude may be considered in controlling the correlator sets so as to facilitate the reception of preamble signals in a large delay amount position. This is because of avoiding the following: Since a mobile unit with a large delay amount, i.e., a mobile unit distant from a base station must transmit preamble signals with large power compared with a nearby mobile unit, retransmitting preamble signals of the distant mobile unit many times causes large interference with signals of other mobile units. In other words, in the large delay amount, even if the preamble signal detection frequency is low, without simply decreasing the number of the correlator sets, the sample rate is controlled so as not to be lowered.

INDUSTRIAL APPLICABILITY

According to the present invention, frequency at which preamble signals are detected is calculated, and the number of the correlator sets used in detecting the preamble signals is adaptively changed according to its detection frequency, thereby increasing the operation rate of the RAKE receivers of the decoder, and allowing the throughput of the message signals to be enhanced.

What is claimed is:
1. A path diversity reception device for a spread spectrum communication system, comprising:
    a path detector comprising a plurality of correlator sets for detecting preamble signals or paths of message signals;
    a decoder comprising a plurality of RAKE receivers being provided corresponding to said each correlator set for using path information from said path detector for decoding said message signals; and a control portion for controlling these, wherein:

said control portion comprises:

control means for calculating frequency at which preamble signals are detected within constant time in said path detector, for decreasing the number of correlator sets used in detecting said preamble signals in a delay amount interval in which said detection frequency is low, and for lowering a sample rate of correlation value calculation, and setting means for using said decreased correlator sets in detecting paths of message signals or other channel signals and using its path information with said corresponding RAKE receivers for decoding said message signals or other channel signals.

2. The path diversity reception device according to claim 1, wherein:

detection frequency of said preamble signals is regularly calculated, and when said preamble signal detection frequency is increased in a delay amount interval in which said sample rate has been lowered, the number of correlator sets used in detecting said preamble signals is controlled to be increased to restore said sample rate.

3. The path diversity reception device according to claim 1, wherein:

in a delay amount interval in which said preamble signal detection frequency is low, without decreasing the number of said correlator sets in an interval in which a delay amount is larger than a constant value, said sample rate is controlled so as not to be lowered.

4. The path diversity reception device according to claim 2, wherein:

in a delay amount interval in which said preamble signal detection frequency is low, without decreasing the number of said correlator sets in an interval in which a delay amount is larger than a constant value, said sample rate is controlled so as not to be lowered.

5. A path diversity reception method for a spread spectrum communication system with a path diversity reception device that comprises a path detector comprising a plurality of correlator sets for detecting preamble signals or paths of message signals, and a decoder comprising a plurality of RAKE receivers being provided corresponding to said each correlator set for using path information from said path detector for decoding said message signals, said method comprising the set of:

calculating frequency at which preamble signals are detected within constant time in said path detector, decreasing the number of correlator sets used in detecting said preamble signals in a delay amount interval in which said detection frequency is low, and lowering a sample rate of correlation value calculation; and performing a setting for using said decreased correlator sets in detecting paths of message signals or other channel signals and using its path information with said corresponding RAKE receivers for decoding said message signals or other channel signals.

6. The path diversity reception method according to claim 5, wherein:

detection frequency of said preamble signals is regularly calculated, and when said preamble signal detection frequency is increased in a delay amount interval in which said sample rate has been lowered, the number of correlator sets used in detecting said preamble signals is controlled to be increased to restore said sample rate.

7. The path diversity reception method according to claim 5, wherein:

in a delay amount interval in which said preamble signal detection frequency is low, without decreasing the number of said correlator sets in an interval in which a delay amount is larger than a constant value, said sample rate is controlled so as not to be lowered.

8. The path diversity reception method according to claim 6, wherein:

in a delay amount interval in which said preamble signal detection frequency is low, without decreasing the number of said correlator sets in an interval in which a delay amount is larger than a constant value, said sample rate is controlled so as not to be lowered.

9. A path diversity reception device for a spread spectrum communication system, comprising:

a path detector comprising a plurality of correlator sets for detecting preamble signals or paths of message signals;

a decoder comprising a plurality of RAKE receivers being provided corresponding to said each correlator set for using path information from said path detector for decoding said message signals; and a control portion for controlling these, wherein:

said control portion comprises:

a controller which calculates frequency at which preamble signals are detected within constant time in said path detector, decreases the number of correlator sets used in detecting said preamble signals in a delay amount interval in which said detection frequency is low, and lowers a sample rate of correlation value calculation, and a setter which uses said decreased correlator sets in detecting paths of message signals or other channel signals and uses its path information with said corresponding RAKE receivers to decode said message signals or other channel signals.

10. The path diversity reception device according to claim 9, wherein:

detection frequency of said preamble signals is regularly calculated, and when said preamble signal detection frequency is increased in a delay amount interval in which said sample rate has been lowered, the number of correlator sets used in detecting said preamble signals is controlled to be increased to restore said sample rate.

11. The path diversity reception device according to claim 9, wherein:

in a delay amount interval in which said preamble signal detection frequency is low, without decreasing the number of said correlator sets in an interval in which a delay amount is larger than a constant value, said sample rate is controlled so as not to be lowered.

12. The path diversity reception device according to claim 10, wherein:

in a delay amount interval in which said preamble signal detection frequency is low, without decreasing the number of said correlator sets in an interval in which a delay amount is larger than a constant value, said sample rate is controlled so as not to be lowered.

* * * * *